United States Patent
Prieto et al.

(10) Patent No.: US 11,685,826 B2
(45) Date of Patent: Jun. 27, 2023

(54) CROSS-LINKABLE ETHYLENE POLYMER COMPOSITION COMPRISING EPOXY-GROUPS AND A CROSS-LINKING AGENT

(71) Applicant: BOREALIS AG, Vienna (AT)

(72) Inventors: Oscar Prieto, Gothenburg (SE); Massimiliano Mauri, Västra Frölunda (SE); Christian Müller, Gothenburg (SE)

(73) Assignee: BOREALIS AG, Vienna (AT)

( * ) Notice: Subject to any disclaimer, the term of this patent is extended or adjusted under 35 U.S.C. 154(b) by 332 days.

(21) Appl. No.: 16/760,525

(22) PCT Filed: Oct. 25, 2018

(86) PCT No.: PCT/EP2018/079291
§ 371 (c)(1),
(2) Date: Apr. 30, 2020

(87) PCT Pub. No.: WO2019/086323
PCT Pub. Date: May 9, 2019

(65) Prior Publication Data
US 2021/0221989 A1 Jul. 22, 2021

(30) Foreign Application Priority Data
Oct. 31, 2017 (EP) .................... 17199485

(51) Int. Cl.
C08L 23/08 (2006.01)
C08J 3/22 (2006.01)
C08K 5/17 (2006.01)

(52) U.S. Cl.
CPC ........... *C08L 23/0884* (2013.01); *C08J 3/226* (2013.01); *C08K 5/17* (2013.01); *C08J 2323/08* (2013.01); *C08J 2423/06* (2013.01); *C08L 2310/00* (2013.01); *C08L 2312/00* (2013.01)

(58) Field of Classification Search
CPC .................. C08L 23/0846; C08L 23/0884
See application file for complete search history.

(56) References Cited

U.S. PATENT DOCUMENTS

| | | | |
|---|---|---|---|
| 4,758,629 A | 7/1988 | Deyrup et al. | |
| 5,492,760 A * | 2/1996 | Sarma | H01B 3/28 428/447 |
| 2012/0128910 A1* | 5/2012 | Mahabir | C08K 3/34 264/209.6 |
| 2013/0206453 A1* | 8/2013 | Fagrell | H01B 3/441 252/511 |
| 2013/0220666 A1 | 8/2013 | Fagrell et al. | |
| 2016/0083512 A1* | 3/2016 | Kamada | C08G 64/0208 528/370 |
| 2016/0125975 A1 | 5/2016 | Briceno Garcia et al. | |
| 2017/0263348 A1 | 9/2017 | Combessis et al. | |

FOREIGN PATENT DOCUMENTS

| | | |
|---|---|---|
| EP | 2444455 A1 | 4/2012 |
| EP | 2444980 A1 | 4/2012 |
| FR | 2498609 A1 | 7/1982 |
| FR | 2569411 A1 | 2/1986 |
| FR | 2569412 A1 | 2/1986 |
| JP | 06116362 | 4/1994 |
| WO | 2010040964 A1 | 4/2010 |

OTHER PUBLICATIONS

International Search Report and Written Opinion dated Feb. 1, 2019 in International Application No. PCT/EP2018/079291 (11 pages).
Encyclopedia of Polymer Science and Engineering, vol. 6 (1986), pp. 383-410.
Klimesch, et al., "Encyclopedia of Materials: Science and Technology", Elsevier Science Ltd.: "Polyethylene: High-pressure,", 2001, 7181-7184.

* cited by examiner

*Primary Examiner* — Jeffrey C Mullis
(74) *Attorney, Agent, or Firm* — Meunier Carlin & Curfman LLC

(57) ABSTRACT

The present invention relates to an ethylene polymer composition comprising: (A) an ethylene polymer comprising epoxy-groups, and (B) a cross-linking agent comprising: (B1) an organo-metallic Lewis acid, and at least one of: (B2) a compound comprising at least one amino group; and (B3) a compound comprising at least one hydroxyl group.

16 Claims, No Drawings

CROSS-LINKABLE ETHYLENE POLYMER COMPOSITION COMPRISING EPOXY-GROUPS AND A CROSS-LINKING AGENT

TECHNICAL FIELD

The present invention relates to an ethylene polymer composition comprising an ethylene polymer comprising epoxy groups and a cross-linking agent, a cable comprising at least one layer comprising such a ethylene polymer composition, a master batch comprising the cross-linking agent, a process for cross-linking such an ethylene polymer composition and the use of a cross-linking agent for cross-linking such an ethylene polymer composition.

BACKGROUND OF THE INVENTION

In power cables, such as power cables for medium voltage (6 to 36 kV) and high voltages (>36 kV), the electric conductor is usually coated first with an inner semiconducting layer, followed by an insulating layer, then an outer semiconducting layer, followed by optional layer(s) such as water-barrier layer(s) and on the outside optionally sheath layer(s). The layers of the cable are commonly based on different types of ethylene polymers.

The insulating layer and the semiconducting layers normally consist of ethylene homo- and/or copolymers which are preferably cross-linked. LDPE (low density polyethylene), i.e. polyethylene prepared by radical polymerization at a high pressure and cross-linked with peroxide, e.g. dicumyl peroxide, in connection with the extrusion of the cable, has become the predominant cable insulating material.

The inner semiconducting layer normally comprises an ethylene copolymer, such as an ethylene-vinyl acetate copolymer (EVA), ethylene methylacrylate copolymer (EMA), ethylene ethylacrylate copolymers (EEA), ethylene butylacrylate copolymer (EBA), cross-linking agent (e.g. peroxide) and sufficient amount and type of conductive filler to make the composition semiconductive.

The composition of the outer semiconducting layer may differ from the composition of the inner semiconductive layer depending on whether it has to be strippable or not. If the outer semiconductive layer shall not be strippable, the composition can be of the same type as for the inner semiconductive layer.

Although prior art compositions for layers in electric cables are satisfactory for many applications, there is always a desire to improve their characteristics such as processability and cross-linking behaviour and eliminate or reduce any disadvantages they may have.

One disadvantage of usual cable layers is that cross-linking of cable layers is accomplished using peroxides. Cross-linking using peroxides suffers from some disadvantages. For example, low-molecular by-products are formed during cross-linking which have unpleasant odor. Furthermore, prior to the extrusion of the polyolefin composition, the peroxide has to be added in a separate processing step into the polymer, which increases the lead time. In addition, to achieve a high cross-linking density, organic peroxide is required which releases a high level of undesired by-products after peroxide degradation. The peroxide degradation temperature limits the maximum possible melt temperature in the extruder to about 140° C. Above that temperature, cross-linking will occur in the extruder which will result in scorch particles in the cable. However, the maximum melt temperature of 140° C. in the extruder limits the extruder output and might result in a lower production speed.

Other options for cross-linking ethylene polymers especially for cable applications are the use of ethylene polymers comprising epoxy groups and cross-linking or curing agents, as are described for example in EP 2 444 980 and EP 2 444 455.

It is a first object of the present invention to provide an ethylene polymer composition especially for use in a layer of a cable which can be cross-linked to the required cross-linking degree without using peroxide or by using only a (very) low amount of peroxide.

Moreover, it is an object of the present invention to provide an ethylene polymer composition, in particular for the insulation layer of a power cable, which cross-links at a moderate temperature and short time at a high cable line speed.

SUMMARY OF THE INVENTION

The present invention therefore provides an ethylene polymer composition comprising:
(A) an ethylene polymer comprising epoxy-groups, and
(B) a cross-linking agent comprising:
  (B1) an organo-metallic Lewis acid, and at least one of:
  (B2) a compound comprising at least one amino group; and
  (B3) a compound comprising at least one hydroxyl group.

Lewis acid as the crosslinking agent (B1) is defined herein by a molecular entity (and the corresponding chemical species) that is an electron-pair acceptor and therefore is able to react with a Lewis base to form a Lewis adduct, by sharing the electron pair furnished by the Lewis base.

Preferable Lewis acid is selected from compounds containing lanthanides or an element of groups 2 to 14 of the IUPAC periodic table (1989) except the elements of the group 7 of the IUPAC periodic table (1989) and Be, C, Si, Ge, Tl, Pb, Tc, Hg and Cd. In the present invention lanthanides are lanthanum, cerium, praseodymium, neodymium, samarium, europium, gadolinium, terbium, dysprosium, holmium, erbium, thulium, ytterbium or lutetium.

More preferable Lewis acids are compounds of the following formula (I)

$$M^{m+}L_n \qquad (I),$$

wherein M is an element selected from lanthanides or an element of groups 2 to 14 of the IUPAC periodic table (1989) except the elements of the group 7 of the IUPAC periodic table (1989) and Be, C, Si, Ge, Tl, Pb, Tc, Hg and Cd, each L is the same or different and is a ligand linked to M; and m is 1 to 4, and n is 1 to 4, with the proviso that m−n is 0.

Integer "n" thus depends on the oxidation state +m and is chosen to provide a net charge of the compound $M^{+m}L_n$ to be 0.

In a more preferable subgroup of Lewis acids of compounds of formula (I):

M is selected from lanthanides and an element of the groups 4, 11, 12, 13 and 14 of the IUPAC periodic table (1989) except the elements of the group 7 of the IUPAC periodic table (1989) and C, Si, Ge, Tl, Pb, Tc, Hg and Cd, more preferably M is an element selected from group 4, 11, 12, 13 or 14 as defined above, more preferably M is selected from Ti (titanium), Zr (zirconium), Hf (hafnium), Sn (tin), Al (aluminium), Cu (copper), Zn (zinc) and B (boron), more preferably M is Ti, Al, Sn, Zn or Cu, most preferably M is Ti, Zn, Cu or Al, and, even more preferably from Ti or Al;

Each L may be independently selected from:
optionally substituted saturated or partially unsaturated hydrocarbyl group;

optionally substituted aromatic hydrocarbyl ring system;

two or more L are independently a divalent saturated or partially unsaturated hydrocarbyl group linked to the other ligand(s) L via a X atom and form together with M a ring system which may optionally be substituted, X is carbon or a hetero atom;

wherein each hydrocarbyl group as L or in a ring system formed by two or more L may independently contain one or more hetero atoms selected from N, O, P, S or Si, preferably from one or more of N, O, P, and wherein the number of optional substituents, if present in any of L or the ring system formed by two or more L, is independently 1 to 4;

—OH group;

halogen, preferably —F, —Cl, —Br, group;

$CF_3SO_3$— group;

methyl or ethyl methanesulfonate group.

The term "optional" in the present invention means "may or may not be present", e.g. "optionally substituted" covers the possibilities that a substituent is present or is not present. The term "unsubstituted" naturally means that no substituent is present.

The below preferred subgroups of compounds (B1) of formula (I) are generalisable in any combination(s).

The position of the heteroatom in optionally substituted linear or branched saturated partially unsaturated hydrocarbyl group or in optionally substituted aromatic hydrocarbyl ring system or in the ring system formed by two or three or more L together with M is not limited. Accordingly, any hydrocarbyl may be linked to M via a heteroatom and/or the carbon atoms of any hydrocarbyl can be interrupted by one or more heteroatoms.

The optional substituents may be attached to a carbon or a hetero atom of the hydrocarbyl group. The optional substituents are selected independently from a functional group which is preferably selected from one or more of =O, —OH, $NR_1R_2$, wherein $R_1$ or $R_2$ are H or C1-C12 alkyl; —$COOR_4$, wherein $R_4$ is H or C1-C12 alkyl —$CONR_5$, wherein $R_5$ is H or C1-C12 alkyl; halogen, which is preferably F, Cl or Br, —OH; methyl or ethyl methanesulfonate; $CF_3SO_3$—; or from a hydrocarbyl with up to 20 carbon atoms in case of any ring system present in or formed by the hydrocarbyl.

Any ring system present in L or formed by two or more L can be mono cyclic or polycyclic ring system. Polycyclic means fused ring systems and also ring systems formed by three L ligands linked to each other via X and M. In case of two or more L form a ring system, the ring can be saturated, partially unsaturated or aromatic, preferably saturated. The number of ring atoms in any ring system is preferably 5 to 14.

In the preferable subgroup of compounds of formula (I) the substituted or unsubstituted saturated or partially unsaturated hydrocarbyl group as L is more preferably:

(i) an optionally substituted linear or branched, saturated or partially unsaturated hydrocarbyl group with up to 30 carbon atoms; more preferably linear or branched C1-C20 alkyl, linear or branched C2-C20 alkenyl or linear or branched C2-C20 alkynyl, more preferably linear or branched C1-C20 alkyl, linear or branched C2-C20 alkenyl;

(ii) an optionally substituted linear or branched, saturated or partially unsaturated hydrocarbyl group which bears a saturated or partially unsaturated cyclic hydrocarbyl moiety or an optionally substituted linear or branched, saturated or partially unsaturated hydrocarbyl group which bears an aromatic hydrocarbyl moiety; preferably an optionally substituted linear or branched, saturated or partially unsaturated hydrocarbyl group which bears a saturated or partially unsaturated cyclic hydrocarbyl moiety; or (iii) an optionally substituted saturated or partially unsaturated cyclic hydrocarbyl group wherein one or more ring atoms are optionally a heteroatom selected from N, O, P, S or Si, preferably N, O or P.

Any optionally substituted cyclic hydrocarbyl group is preferably saturated and contains 5 to 7 ring atoms. Any optionally substituted aromatic ring system is preferably an optionally substituted phenyl, naphthyl or anthracene ring system.

Each L may be a group comprising 1 to 30 carbon atoms and selected independently from optionally substituted hydrocarbyl with no hetero atoms; optionally substituted —O-hydrocarbyl group; —O—(C=O)-hydrocarbyl group; —O—(P=O)-hydrocarbyl group; or two or three L are —O-hydrocarbyl- linked to each other via a X atom, which is C or N atom, and form together with M a cyclic ring system; wherein each hydrocarbyl is independently as defined above.

Lewis acids as the crosslinking agent (B1) may be a subgroup of compounds of formula (I), wherein each L is a hydrocarbyl group selected independently form linear or branched C1-C20 alkyl optionally bearing one or two, preferably one, if present, substituent(s) as defined above, preferably linear or branched C1-C20 alkyl;

—O-(linear or branched C1-C20 alkyl) optionally bearing one or two, preferably one, if present, substituent(s) as defined above, —O-(linear or branched C2-C20 alkenyl) optionally bearing one or two, preferably one, if present, substituent(s) as defined above, more preferably —O-(linear or branched C2-C20 alkenyl) optionally and preferably bearing one or two, preferably one, substituent which is preferably (=O);

—O—(P=O)-(linear or branched C1-C20 alkyl) optionally bearing one or two, preferably one, if present, substituent(s) as defined above, —O—(P=O)-(linear or branched C2-C20 alkenyl) optionally bearing one or two, preferably one, if present, substituent(s) as defined above, more preferably O—(P=O)-(linear or branched C1-C20 alkyl); or three L are independently —O-ethylene- each linked to X which is N and the three L form together with M a polycyclic ring system.

Each L may be the same or different and may have the formula —O—$CR^1R^2R^3$, wherein $R^1$ is an organic group and $R^2$ and $R^3$ independently from each other are organic groups or H, or $R^2$ and $R^3$ are =O.

$R^1$, $R^2$ and/or $R^3$ may be hydrocarbyl-groups, optionally containing hetero atoms.

Preferably, if $R^1$, $R^2$ and/or $R^3$ are selected from organic or, more preferably, from hydrocarbyl groups; these groups independently from each other contain from 1 to 200 C-atoms, more preferably from 2 to 100 C-atoms, still more preferably from 3 to 75 C-atoms, and most preferably from 4 to 50 C-atoms.

Furthermore, in the above formula $R^2$ and/or $R^3$ are preferably H.

Still further, preferably $R^1$ is an alkyl group, more preferably $R^1$ is a branched or non-branched $C_1$- to $C_{50}$-alkyl group, still more preferably $R^1$ is a branched or non-branched $C_2$- to $C_{30}$-alkyl group, and most preferably $R^1$ is a branched or non-branched $C_3$- to $C_{20}$-alkyl group.

In particular, compounds (B1) may be of formula (I):

$$TiL_4 \quad (I)$$

wherein each L is the same or different and is a ligand linked to Ti.

An example for a particularly preferred organometallic Ti-based Lewis acid is tetrakis(2-ethylhexyl) orthotitanate (CAS number: 1070-10-6).

Examples for particularly preferred Lewis acids as the crosslinking agent (B) are (triethanolatoamine) Ti—O—$R_{20}$ wherein $R_{20}$ is a linear or branched (C1-12)alkyl), preferably a linear or branched (C1-6)alkyl), such as triethanolatoamine titanium isopropanolate (CAS number 74665-17-1). Further particularly preferred Lewis acids are titanium tristearate monoisopropanolate, titanium diacetylacetonate diisopropanolate (CAS number: 27858-32-8), titanium(IV) butoxide (CAS number 5593-70-4), titanium diisopropoxide bis(acetylacetonate) (CAS number 17927-72-9), titanium isopropoxide (4) (CAS number 546-68-9), tetrakis(2-ethylhexyl) orthotitanate (CAS number 1070-10-6).

As mentioned above, the cross-linking agent (B) further comprises at least one of (B2), being a compound comprising at least one amino group; and (B3), being a compound comprising at least one hydroxyl group. In other words, the cross-linking agent (B) comprises (B1) and (B2), or (B1) and (B3), or all three of (B1), (B2) and (B3).

Compound (B2) may be selected from saturated aliphatic (mono, di or tri)amine with up to 50, preferably 1 to 20, carbon atoms; unsaturated aliphatic (mono, di or tri)amine with up to 50, preferably 1 to 20, carbon atoms; aromatic hydrocarbyl with up to 50, preferably 1 to 20, carbon atoms. Compound (B2) may comprise at least two amino substituents. Further, the aliphatic or aromatic moiety may optionally contain one or more hetero atoms and/or further substituents.

Compound (B2) having at least two amine groups may be a branched or non-branched, preferably non-branched $C_1$ to $C_{30}$, more preferably $C_2$ to $C_{20}$, and most preferably $C_3$ to $C_{15}$ alkyl compound. Preferably, the at least two amine groups in said compound are present at the first and last C-atom of the longest chain of C-atoms in the molecule.

Compound (B2) may be selected from propylamine, stearylamine, preferably 1,6-hexadiamine, 1,7-diaminoheptane, 1,8-diaminooctane, trioctamine, aniline, 2-ethylaniline, diethylenetriamine, triethylenetetramine and diethylamino propylamine; cycloaliphatic ring polyamine such as menthendiamine, isophorone diamine, bis(4-amino-3-methylcyclohexyl)methane and N-aminoethyl piperazine; aliphatic polyamine comprising aromatic ring such as meta xylenediamine, polyethyleneimine containing the second and tertiary amine nitrogen; aromatic polyamine such as methaphenylenediamine, methylenediamine and diaminodiphenyl sulfone; and modified polyamine of aliphatic polyamines, aliphatic polyamine comprising aromatic ring(s) and/or aromatic polyamines obtainable by well known modification methods, such as addition reaction with epoxy compound, Michael addition reaction with acrylonitrile acrylic ester, and Mannich reaction with a methylol compound, for example imidazole family, such as 2-methylimidazole, 2-ethyl-4 methylimidazole and 1-cyanoethyl-2 methylimidazole, and tri-2-ethylhexyl acid salt of tertiary amine such as tris-dimethylamino phenol, and tris-dimethylamino methyl phenol; more preferable amines comprise at least two amino groups of which non-limiting examples are 1,7-diaminoheptane, tetraamine having the following structural formula:

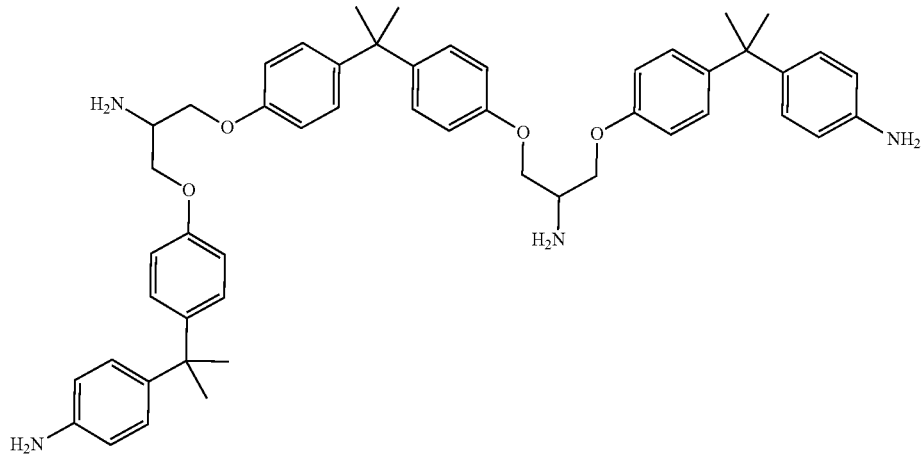 [SMILES: CC(C)(c1ccc(N)cc1)c1ccc(OCC(N)COc2ccc(C(C)(C)c3ccc(OCC(N)COc4ccc(C(C)(C)c5ccc(N)cc5)cc4)cc3)cc2)cc1]

diamine having the following structural formula:

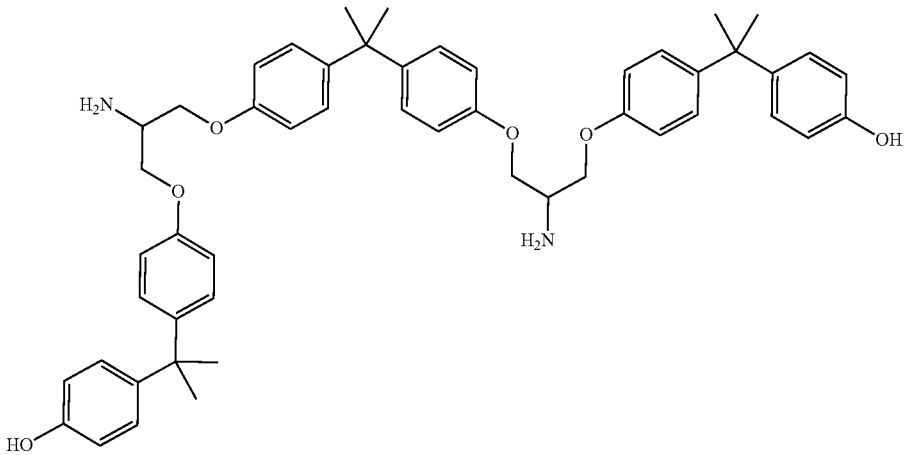 [SMILES: CC(C)(c1ccc(O)cc1)c1ccc(OCC(N)COc2ccc(C(C)(C)c3ccc(OCC(N)COc4ccc(C(C)(C)c5ccc(O)cc5)cc4)cc3)cc2)cc1]

the most preferred amine being 1,8-diaminooctane.

Further, compound (B2) may comprise an ether compound having at least two amine groups, the ether compound is preferably an alkyl ether $C_{10}$ to $C_{100}$ compound, which may or preferably may not contain further heteroatoms.

Examples of such ether compounds are tri alkylol alkane tris[poly(alkylene glycol) amine terminated] ethers, wherein alkylol preferably is a $C_1$ to $C_{10}$, more preferably $C_1$ to $C_5$ alkylol group, alkane preferably is an $C_1$ to $C_{10}$, more preferably $C_2$ to $C_8$ alkane group, and alkylene preferably is an $C_1$ to $C_{10}$, more preferably $C_2$ to $C_8$ alkylene group.

In particular, the ether is tri methylol propane tris[poly (propylene glycol) amine terminated] ether (CAS number 39423-51-3), preferably with an average $M_n$ of 300 to 600.

Compound (B3) may be selected from aliphatic di- to hexa-alcohols or aromatic di- to hexa-alcohols, preferably from aliphatic di-, tri- or tetra-alcohols or aromatic di-, tri- or tetra-alcohols. The alcohols may comprise 2 to 100, preferably 15 to 90, more preferably 15 to 90, most preferably 30 to 70, carbon atoms and may optionally comprise further heteroatoms which, if present, are preferably selected from N, S, O and/or P, more preferably from S, O or P even more preferably from S or O and most preferably the further heteroatom(s) are O.

Compound (B3) comprises may have the formula (II):

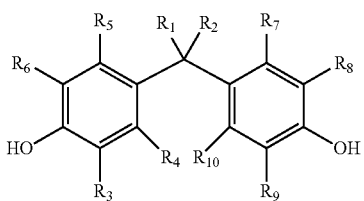

(II)

wherein $R^1$, $R^2$, $R^3$, $R^4$, $R^5$, $R^6$, $R^7$, $R^8$, $R^9$ and $R^{10}$ independently from each other are a hydrocarbyl group, which preferably comprises from 1 to 50 C-atoms, more preferably from 1 to 20 C-atoms, and most preferably from 1 to 10 C-atoms, or H.

The hydrocarbyl group(s) may or may not comprise hetero atoms.

More preferably, $R^1$ and $R^2$, independently from each other are an alkyl group, which preferably comprises 1 to 50 C-atoms, more preferably from 1 to 20 C-atoms, and most preferably from 1 to 10 C-atoms, and $R^3$, $R^4$, $R^5$, $R^6$, $R^7$, $R^8$, $R^9$ and $R^{10}$ independently from each other are an alkyl group, which preferably comprises 1 to 50 C-atoms, more preferably from 1 to 20 C-atoms, and most preferably from 1 to 10 C-atoms, or H.

Still more preferably, $R^1$ and $R^2$ are each a methyl group, and $R^3$, $R^4$, $R^5$, $R^6$, $R^7$, $R^8$, $R^9$ and $R^{19}$ independently from each other are a methyl group or H.

In particular, compound (B3) may be 2,2-bis(4-hydroxy-3-methylphenyl)propane (CAS no. 79-97-0).

Non-limiting examples of crosslinking agents (B2) and (B3) are given e.g. in JP06-116362.

As to the olefin polymer (A) containing epoxy groups, the expression means an olefin polymer wherein a unit containing epoxy group is incorporated. Such unit is referred herein as an "epoxy-group-containing monomer unit" and means an unsaturated compound comprising an epoxy group, preferably vinyl group containing compound bearing an epoxy group. Such compounds can be used as comonomers for copolymerising epoxy-containing monomers units to the olefin polymer (A) or can be grafted to the olefin polymer (A), as well known in the polymer field. Grafting and copolymerizing of epoxy-group containing monomer units can be made according to or analogously to the methods described in the literature. The olefin polymers (A) containing epoxy groups as well as the epoxy-group-containing monomer units are very well known (mentioned e.g. in JP 06-116362 of Nippon Petrochem Co. LTD and WO 2010040964 of Arkema France) and commercially available. As preferable examples of epoxy-containing monomer units, e.g. aliphatic esters and glycidyl ethers such as an allyl glycidyl ether, a vinyl glycidyl ether, a maleate or itaconate of glycidyl, a (meth)glycidyl acrylate, and alicyclic esters and glycidyl ethers, such as a 2-cyclohexene-1-glycidylether, a cyclohexene-4,5-diglycidyl carboxylate, a cyclohexene-4 glycidyl carboxylate, a 5-norbornene-2-methyl-2-glycidyl carboxylate and a endo cis-bicyclo (2,2,1)-5-heptene-2,3-diglycidyl dicarboxylate, can be mentioned.

In the present invention the epoxy-containing monomer unit is preferably incorporated as a comonomer, i.e. by copolymerising an olefin monomer with the vinyl group containing comonomer bearing an epoxy group (=epoxy-group-containing monomer unit).

Most preferably, the epoxy-group-containing monomer units are glycidyl methacrylate comonomer units.

Preferably, the amount of epoxy-group-containing monomer units is at least 0.1 wt %, more preferably at least 0.5 wt %, more preferably at least 1 wt %, based on the amount of olefin polymer (A).

The content of epoxy-group-containing monomer units is preferably 20 wt % or less, preferably 15 wt %, more preferably 10 wt % or less and most preferably 5 wt % or less, based on the amount of olefin polymer (A).

The suitable olefin polymer (A) can be a homopolymer or a copolymer of an olefin, wherein the epoxy-group-containing monomer units are grafted as defined above, or a copolymer of an olefin at least the epoxy-group-containing monomer units as defined above. Preferred olefin polymer (A) is a copolymer of an olefin with at least the epoxy-group-containing monomer units as defined above, more preferably a copolymer of an olefin with at least glycidyl methacrylate comonomer units.

The olefin polymer (A) may comprise further comonomer(s) different from epoxy-group containing monomer units, and if present, then preferably polar comonomer(s) different from epoxy-group containing monomer units. In case olefin polymer (A) comprises polar comonomer(s), then the polar group containing monomer units are preferably present in an amount of at least 5.0 wt %, more preferably of at least 8 wt %, more preferably of at least 12 wt %, and most preferably of at least 15 wt % based on the amount of olefin polymer (A). In case olefin polymer (A) comprises polar comonomers, then, preferably, the polar group containing monomer units are present in an amount of not more than 50 wt %, more preferably not more than 45 wt % even more preferably of not more than 40 wt % and most preferably of not more than 35 wt % based on the amount of olefin polymer (A).

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention the term "alkyl (meth)acrylate comonomer units" encompasses alkyl acrylate comonomer units and/or alkyl methacrylate comonomer units.

The alkyl moiety in the alkyl(meth)acrylate comonomer units may be selected from C1 to C8-hydrocarbyls, whereby the C3 or C4 hydrocarbyl may be branched or linear.

Preferred olefin polymer (A) is polyethylene comprising epoxy-groups-containing monomer units, more preferably a copolymer of ethylene with at least the epoxy-group-containing monomer units as defined above, more preferably with at least glycidyl methacrylate comonomer units.

The copolymer of ethylene with at least the epoxy-group-containing monomer units as the preferable olefin polymer (A) is referred herein also shortly as ethylene/epoxy copolymer.

The ethylene/epoxy copolymer may further comprise further comonomer units.

It is preferred that the olefin polymer (A) is a copolymer of ethylene with at least epoxy-groups containing comonomer and optionally with other comonomer(s), different from epoxy-group containing monomer units, which other comonomer is preferably a polar comonomer different from epoxy-group containing monomer units, more preferably an acrylate or acetate group containing comonomer units. More preferably the olefin polymer (A) is selected from an ethylene copolymer with glycidyl methacrylate comonomer units or an ethylene copolymer with glycidyl methacrylate comonomer units and a polar comonomer selected from alkyl(meth)acrylate or a vinyl acetate comonomer units, even more preferably from an alkyl acrylate or a vinyl acetate comonomer units, even more preferably from a methyl acrylate, ethyl acrylate, butyl acrylate or vinyl acetate comonomer units, most preferably from a methyl acrylate, an ethyl acrylate or butyl acrylate comonomer units. Most preferably the olefin polymer (A) is selected from ethylene copolymer with glycidyl methacrylate comonomer units or ethylene copolymer with glycidyl methacrylate comonomer units and C1-C4 alkyl acrylate comonomer units, preferably methyl acrylate comonomer units. Moreover, the most preferred ethylene/epoxy copolymer for the (semiconductive) polyolefin composition is an ethylene copolymer with polar comonomer units as defined above, preferably an ethylene-C1-C4 alkyl acrylate-glycidyl methacrylate copolymer, preferably ethylene-methyl acrylate-glycidyl methacrylate copolymer, and glycidyl methacrylate. Moreover, the most preferred ethylene/epoxy copolymer for the polyolefin composition (b) is selected from ethylene copolymer with glycidyl methacrylate comonomer units or ethylene copolymer with methyl acrylate comonomer units and glycidyl methacrylate comonomer units, more preferably from an ethylene copolymer with glycidyl methacrylate comonomer units.

The ethylene polymer as the preferred olefin polymer (A) has a melt flow rate MFR2, determined according to ISO 1133 under a load of 2.16 kg and a temperature of 190° C., of at least 0.1 g/10 min, more preferably of at least 0.5 g/10 min. More preferably such ethylene polymer has a melt flow rate MFR2, determined according to ISO 1133 under a load of 2.16 kg and a temperature of 190° C., of 75 g/10 min or less, more preferably 60 g/10 min or less, even more preferably 55 g/10 min or less.

The ethylene polymer as the preferred olefin polymer (A) has a density of higher than 860 kg/m$^3$. Preferably such ethylene polymer has a density of not higher than 960 kg/m$^3$, and preferably of not higher than 955 kg/m$^3$.

The preferred ethylene polymer as olefin polymer (A) is preferably low density ethylene polymer (LDPE) produced in a high pressure (HP) process in a tubular or autoclave reactor or in any combination thereof, both in case the epoxy-group-containing monomer units are grafted to a homopolymer or copolymer of ethylene after the production of the ethylene polymer as olefin polymer (A), and in case the epoxy-group-containing monomer units are copolymerised with ethylene and optionally with other comonomer(s). Hence, in case the epoxy-group containing monomer units are introduced by grafting the polymer prior to grafting may also be produced by this process.

Accordingly, the olefin polymer (A) of the invention is preferably a LDPE polymer, which is preferably produced at high pressure by free radical initiated polymerisation. The high pressure (HP) polymerisation is widely described in the literature and the adjustment of process conditions for further tailoring the other properties of the polyolefin depending on the desired end application is within the skills of a skilled person.

In a tubular reactor the polymerisation is effected at temperatures which typically range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps. Further details of the production of ethylene (co)polymers by high pressure radical polymerization can be found i.a. in the Encyclopedia of Polymer Science and Engineering, Vol. 6 (1986), pp 383-

410 and Encyclopedia of Materials: Science and Technology, 2001 Elsevier Science Ltd.: "Polyethylene: High-pressure, R. Klimesch, D. Littmann and F.-O. Mahling pp. 7181-7184.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available. The polymerization pressure is typically 20 to 300, such as 20 to 250, MPa. The polymerization reaction is exothermic and after startup (at elevated temperature, e.g. from 80 to 150° C. to create the first radicals) the exothermic heat generated sustains the reaction. Temperature in each zone is controlled by the cooled incoming feed mixture. Suitable temperatures range from 80 to 300° C. The process is well known to a skilled person and described e.g. in WO2010040964 of Arkema France, page 11, lines 23-32, and page 12, lines 1-8, or can be produced analogously as described e.g. in FR2498609, FR2569411 and FR2569412. Such autoclave polymerisation is preferred, when ethylene is copolymerized with the epoxy-group-containing monomer as defined above, preferably with glycidyl methacrylate comonomer, and optionally, and preferably, with other comonomer(s), preferably with a polar comonomer as defined above, more preferably alkyl (meth)acrylate, more preferably methyl acrylate, comonomer.

Preferably, in the ethylene polymer composition according to the invention ethylene polymer comprising epoxy group (A) is present in the composition in an amount of at least 10 wt. %, more preferably of at least 30 wt. %, still more preferably of at least 50 wt. %, still more preferably of at least 60 wt. %, most preferably of at least 75 wt. %.

Usually, ethylene polymer comprising epoxy group (A) is present in the composition in an amount of not more than 99.5 wt. %, or not more than 99 wt. %, or not more than 98 wt. % or not more than 95 wt. %. The maximum amount of ethylene polymer comprising epoxy group (A) depends in essence on the amount of additives used.

Furthermore, where the polyolefin composition comprises a conductive filler, then the olefin polymer (A) may be present in such semiconductive polyolefin composition or such semiconductive polyolefin composition (b), in each independently, in an amount of at least 5 wt %, preferably at least 10 wt %, more preferably of at least 20 wt %, based on the total amount of the polyolefin composition. Usually the olefin polymer (A) is present in the semiconductive polyolefin composition in an amount of 90 wt % or less, preferably 85 wt % or less, more preferably from 80 wt % or less, even more preferably from 10 to 75 wt %, even more preferably from 20 to 70 wt %, still more preferably from 30 to 65 wt %, based on the total amount of the polyolefin composition.

In the ethylene polymer composition according to the invention effective cross-linking can be achieved in a temperature range of from 160 to 240° C. and hence well above the temperature usually used for extrusion of polyethylene-containing cables (120 to 140° C.). This makes the composition well suited for the production of a layer of a cable, in particular a layer of a power cable as e.g. the insulation layer, because scorching, i.e. undesired cross-linking during extrusion, is avoided to a far extent.

Furthermore, cross-linking of the composition can be effected at the mentioned temperatures within a short time period of e.g. 3 to 5 minutes, which is suitable for commercial application.

These advantages of the present invention are obtained due to a synergistic effect of the combined use of components (B1) and either one or both of (B2) and (B3) as cross-linking agent.

Still further, unlike peroxide cross-linking, no or only a small amount of volatile by-products are present during cross-linking. Thereby, the safety is improved and furthermore, the production lead time is decreased since an extra processing step, such as degassing step, can be shortened or avoided. Moreover, the obtained products, e.g. cables, have less odor problems.

Hence, the polyolefin composition may contain at most 3.0 wt %, preferably less than 2.0 wt %, more preferably from 0 to less than 1.5 wt % of radical forming agents such as peroxides, even more preferably, the polyolefin composition is free from any added radical forming agent.

In case the ethylene composition of the present invention is a semiconductive composition, the amount in which the conductive filler is present is to be deducted from the amount of the ethylene polymer comprising epoxy group (A), i.e. the above (preferred) amounts given for the ethylene polymer comprising epoxy group (A) alone comprise ethylene polymer comprising epoxy group (A) and conductive filler.

Cross-linking agent (B) denotes all compounds in the polyethylene composition of the invention which are effective in cross-linking. It comprises, or consists of, components (B1), (B2), (B3) in any of the above described combinations.

Preferably, in the ethylene polymer composition according to the invention cross-linking agent (B) is present in the composition in an amount of from 0.2 to 10 wt % based on the total amount of components (A) and (B).

Preferably, cross-linking agent (B) is present in an amount of at least 0.3 wt %, more preferably of at least 0.5 wt % and most preferably of at least 0.8 wt % based on the total amount of olefin polymer (A) and cross-linking agent (B).

Cross-linking agent (B) is preferably present in an amount of 8.0 wt % or less, more preferably in an amount of 6.0 wt % or less and most preferably in an amount of 5.0 wt % or less based on the total amount of olefin polymer (A) and cross-linking agent (B).

Preferably, in the ethylene polymer composition according to the invention organo-metallic Lewis acid (B1) is present in the composition in an amount of from 0.1 to 5 wt. %, more preferably of 0.2 to 3 wt. % and most preferably of 0.5 to 2 wt. % based on the total amount of components (A) and (B).

Furthermore, the amount of elemental metal brought into the composition by way of the organo-metallic Lewis acid (B1) is from 0.005 to 0.2 wt. %, more preferably is from 0.01 to 0.1 wt. % and most preferably is from 0.02 to 0.08 wt. % based on the total amount of components (A) and (B).

Compound (B2) may be present in the ethylene polymer composition according to the invention in an amount of from 0.1 to 10 wt. %, more preferably from 0.2 to 8 wt. %, and most preferably from 0.5 to 5 wt. % based on the total amount of components (A) and (B).

Compound (B3) may be present in the ethylene polymer composition according to the invention in an amount of from 0.1 to 10 wt. %, more preferably from 0.2 to 8 wt. %, and most preferably from 0.5 to 5 wt. % based on the total amount of components (A) and (B).

The polyethylene composition may also comprise further additive(s). As possible further additives, colorants, antioxidants, scorch retarders, cross-linking modulating (e.g. boosting or inhibiting) agents, stabilisers, processing aids, lubricants, compatibilizers, parting agents, anti-caking agents, flame retardant additives, acid scavengers, inorganic fillers, voltage stabilizers, additives for improving water tree resistance, or mixtures thereof can be mentioned.

The present invention also relates to a cable comprising a conductor surrounded by one or more layer(s), wherein at least one layer comprises, or consists of, an ethylene polymer composition according to any of the above-described embodiments.

The term "surrounded" encompasses that the respective layer is directly attached to the conductor as well as that one or more further layers are present between the respective layer and the conductor.

The term "conductor" as used herein denotes wires of a conductive material for e.g. power, such as metals, or information, such as glass fibres, i.e. the wire(s) may be for any use and be e.g. optical, telecommunication or electrical wire. The conductor may comprise one or more wires. Moreover, the cable may comprise one or more such conductors.

In a preferred embodiment, the cable is a power cable, i.e. the conductor is an electrical conductor and comprises one or more metal wires.

Preferably, the power cable is a power cable operating at voltages 6 kV to 36 kV and known as medium voltage (MV) cables, at voltages higher than 36 kV, known as high voltage (HV) cables or extra high voltage (EHV) cables, and most preferably a MV cable.

Preferably, the power cable comprises an inner semiconductive layer surrounding the conductor, an insulation layer surrounding said inner semiconductive layer and an outer semiconductive layer surrounding said insulation layer. Such a construction is usually used for MV, HV and EHV power cables.

Preferably, the at least one layer of the cable comprising, or consisting of, the composition of the invention is selected from an insulation layer, a semiconductive layer or a jacketing layer, preferably from an insulation layer or a semiconductive layer.

In case a semiconductive layer comprises the polyolefin composition of the invention, then the composition further comprises a conductive filler, preferably carbon black.

The amount of conductive filler is at least such that a semiconducting polyolefin composition is obtained. The amount of conductive filler can vary depending on the type of the used carbon black, the conductivity of the composition and desired end use.

Preferably, the conductive filler, preferably carbon black, is present in an amount of at least 10 wt %, preferably at least 15 wt %, even more preferably at least 20 wt. and most preferably at least 30 wt % based on the total amount of semiconductive polyolefin composition.

The conductive filler, preferably carbon black, is preferably present in an amount of 50 wt % or less, more preferably 45 wt % or less and most preferably 40 wt % or less based on the total amount of semiconductive polyolefin composition.

The volume resistivity of such a semiconductive polyolefin composition, determined according to ISO 3915 (1981) at room temperature preferably may be below 100000 ohm·cm, preferably below 1000 ohm·cm.

Preferably, the at least one layer of the power cable comprising, or consisting of, the ethylene polymer composition of the invention is an insulation layer.

In an embodiment, the cable according to the invention has been cross-linked, preferably in a process according to any of the below-described embodiments.

The polyethylene composition of the invention may be used for cable layers which are strippable (peelable) or bonded (not peeled off).

The term "strippable" denotes that the layer has a strip force of 8 kN/m or less, when measured according to "Strip force 90°" as described in EP 2 444 980 A1.

The cable can optionally comprise further layers, e.g. layers surrounding the outer semiconductive layer, such as screen(s), a jacketing layer(s), other protective layer(s) or any combinations thereof.

The present invention also relates to a master batch for adding a cross-linking agent (B) to an ethylene polymer comprising epoxy-groups wherein the master-batch comprises:

(C) an ethylene polymer,
(B1) an organo-metallic Lewis acid, and at least one of:
(B2) a compound comprising at least one amino group; and
(B3) a compound comprising at least one hydroxyl group.

Master batches are frequently used to supply additives to polymer compositions in order to improve homogeneous distribution of the additives in the final polymer composition.

Ethylene polymer (C) may be any ethylene polymer suitable for preparing masterbatches and known to a person skilled in the art.

Master batches contain the additives, e.g. the components of the cross-linking agent (B) in the present case, in a (much) higher concentration than they are supposed to be present in the final polymer composition.

The master batch of the present invention may comprise organo-metallic Lewis acid (B1) in an amount of 2 to 10 wt. %, and compounds (B2) and/or (B3) in an amount of 3 to 25 wt. %.

Still further, the present invention relates to a process for cross-linking of an ethylene polymer comprising epoxy-groups (A) comprising a step of cross-linking the ethylene polymer comprising epoxy-groups using cross-linking agent (B) comprising:

(B1) an organo-metallic Lewis acid, and at least one of:
(B2) a compound comprising at least one amino group; and
(B3) a compound comprising at least one hydroxyl group.

In the process of the invention, the cross-linking agent (B) may be that of any of the above described embodiments and also ethylene polymer comprising epoxy-groups (A) may be that of any embodiment as described above.

The process of the invention allows to carry out cross-linking at conditions commercially applied to cables, especially power cables, and to obtain cross-linked compositions that show elongation hotsets and cross-linking degrees (as shown by gel content values) which are suitable for commercial application.

After cross-linking, the hotset elongation of the composition may be 175% or less, more preferably 100% or less and most preferably 75% or less, when determined according to "Hot set elongation procedure" as described below under "Determination methods".

Preferably, after cross-linking the gel content of the composition may be at least 70%, more preferably at least 75% and most preferably at least 80%.

The cross-linking step may take place for 2 to 10 minutes, preferably for 3 to 8 minutes, most preferably for 4 to 6 minutes.

The cross-linking step may be carried out at a temperature of at least 150° C., more preferably at a temperature of from 180 to 240° C.

Usually, the temperature during cross-linking is below 360° C., preferably below 300° C.

The cross-linking process may be carried out at a pressure of at least 10 bar, more preferably at least 20 bar. Usually the pressure is not higher than 100 bar.

The cross-linking process of the invention is advantageously applied to a cable, preferably a power cable, most preferably to a power cable comprising an insulation layer, in any of the above described embodiments. Such cables are usually formed by (co-)extrusion of the cable layer(s) onto the conductor.

The term "(co-)extrusion" means herein that in case of two or more layers, said layers can be extruded in separate steps, or at least two or all of said layers can be coextruded in a same extrusion step, as well known in the art. The term "(co-) extrusion" means herein also that all or part of the layer(s) are formed simultaneously using one or more extrusion heads.

"Applied onto a conductor" means that the layer material is applied ((co)extruded) directly on a conductor or on a (polymeric) layer(s) around the conductor.

Finally, the present invention relates to the use of a cross-linking agent (B) comprising:
  (B1) an organo-metallic Lewis acid, and at least one of:
  (B2) a compound comprising at least one amino group; and
  (B3) a compound comprising at least one hydroxyl group.
for cross-linking of an ethylene polymer comprising epoxy-groups (A).

In the use of the invention, the cross-linking agent (B) may be used in any of the above described embodiments for any embodiment of the above described ethylene polymer comprising epoxy-groups (A).

DETAILED DESCRIPTION OF THE INVENTION

1. Materials
1.1 P1

P1 is a random polymer of ethylene-glycidyl methacrylate having a glycidyl methacrylate content of 8 wt %, an $MFR_2$ (2.16 kg/190° C.) of 5 g/10 min, a density of 940 kg/m³ and a melting point of 106° C., commercially available from Arkema.

1.2 Ad1

Ad1 is 1,8-Diaminooctane, CAS nr. 373-44-4, commercially available from Sigma Aldrich.

1.3 Ad2

Ad2 is trimethylolpropane tris[poly(propylene glycol) amine terminated] ether, CAS nr. 39423-51-3, commercially available from Sigma Aldrich.

1.4 Ad3

Ad3 is 2,2-Bis(4-hydroxy-3-methylphenyl)propane, CAS nr. 79-97-0, commercially available from Sigma Aldrich.

1.5 Ti1

Ti1 is Tetrakis(2-ethylhexyl) orthotitanate, CAS nr. 1070-10-6, having Mw of 564 g/mol, commercially available from Dorf Ketal.

2. Measurement Methods

Unless otherwise stated in the description or claims, the following methods were used to measure the properties defined generally above and in the claims and in the examples below. The samples were prepared according to given standards, unless otherwise stated.

2.1 Melt Flow Rate

The melt flow rate was determined according to ISO 1133 for ethylene copolymers at 190° C., at a 2.16 kg load (MFR2).

2.2 Density

Density was measured according to ISO 1183-2. The sample preparation was executed according to ISO 1872-2 Table 3 Q (compression moulding).

2.3 Comonomer Content

Determination of comonomer content is effected using the procedure as described in EP 2 444 980 A1, page 19, line 40 to page 20, line 29.

2.4 Hotset Elongation and Hotset Permanent Deformation

Hot set elongation and permanent deformation are determined on dumbbells prepared according to ISO-527-2-5A. Dumbbells were taken from already cross-linked compressed plaques prepared as described below.

The hot set elongation was determined according to IEC 60811-2-1.on dumbbell samples as prepared as described above. The nature of the samples is specified in context. In the hot set test, a dumbbell of the tested material is equipped with a weight corresponding to 20 N/cm2. This specimen was put into an oven at 200° C. and after 5 minutes the elongation was measured. The specimen was then left in the oven with the weight for additional 10 min while the elongation was monitored, usually without indicating any changes. Subsequently, the weight was removed and the specimen was left to recover in the oven for additional 5 min before being extracted. Then, the specimen was taken out from the oven and cooled down to room temperature. The permanent deformation was determined.

Compressed plaques are prepared as follows: Pellets of the test polyethylene composition were compression moulded using the following conditions: First, the pellets were melted at 120° C. at around 20 bar for 1 minutes. Then the pressure was increased to 200 bar, and kept at the pressure and temperature for 6 min. Then material was cooling down to room temperature at rate of 15° C./min at 200 bars. The thickness of the plaque was around 1.8 mm.

The cross-linking density was measured with Hot-set on plaques. This method is use to evaluate curing speeds and screen new curing agents and catalyst without having to extrude complete power cables. Plaques were first melted at 140° C. followed by hot pressing at various temperatures (180-240° C., see table below), a pressure of 100 bar (10 MPa), and various reaction times (2-20 min, see Table below). Thickness of the plaques was 1.25 mm. That hot pressing achieves cross-linking of the composition which simulates a commercial average cable extrusion speed.

2.5 Gel Content

The gel-content of cross-linked samples was determined gravimetrically using a solvent extraction technique. The samples (~150 mg) were placed in pre-weighed 100 mesh stainless steel baskets and extracted in 1.1 dm3 by refluxing decalin for 6 h. An antioxidant, 10 g Irganox 1076 from Ciba-Geigy, was added to the solvent to prevent degradation. Then, the solvent was exchanged with 0.9 dm3 of additive free, pre-heated decalin and the extraction continued for 1 h. Finally, the samples were dried first at ambient overnight and then under vacuum for about 8 hours at 50° C. After this period the non-soluble fraction that remained in the basket reached a constant weight, which was used to calculate the gel-content.

2.6 Compounding

Copolymer/crosslinking agent formulations were compounded through extrusion for 10 minutes at 120° C. using a Haake Minilab Micro Compounder. The extruded material was first molten at 130° C., followed by crosslinking at 180 to 260° C. and a pressure of 25 bar for 2 to 120 min, resulting in 1.25 mm thick plates. Thin films for optical microscopy and FTIR were prepared by drop-casting from 10 g/l hot p-xylene solutions. Films for UV-vis were prepared by melt pressing (0.05 mm thick films melt pressed at 140° C. for 5 minutes).

3. Results

In order to show the effects provided by the present invention, reference compositions (RE1-RE4) and compositions according to the invention (IE1-IE4) were prepared using the materials and the conditions below. These samples were then cross-linked under the conditions and with the results as given in Table 1 below.

RE1 to RE4 comprises a composition with epoxy polymer and a titanate or a curing agent (Ad1 to Ad3). Those samples were cross-linked at operating MV insulation temperatures and times. The results given in Table 1 show that in all cases the samples broke during hotsets testing at 220° C. Only the composition comprising Ad3 (bisphenol additive, RE4) provided sufficiently low elongation during hotsets when the cross-linking time was 20 min at the cross-linking temperature of 240° C., the conditions that are not feasible for the commercial production of insulation layers.

IE1 to IE4 comprise an epoxy polymer together with a small amount of a titanate and an additive (Ad1 to Ad3). The compositions of IE1 and IE2 were cross-linked at commercial conditions for MV cable insulation layers (temperature 220° C. and time 5 min). Further, the composition of IE3 and IE4 was cross-linked at 240° C. for 2 min and 180° C. for 5 min, respectively.

In all cases, the elongation hotsets of IE1 to IE4 met standards (<100% elongation) and provided excellents gel content values, indicating a high degree of cross-linking.

The comparison of the reference examples and the examples according to the invention shows the synergistic advantageous effects of the use of component (B1) in combination with either or both of (B2) and (B3) as cross-linking agent.

TABLE 1

|  | RE1 | RE2 | RE3 | RE4 | IE1 | IE2 | IE3 | IE4 |
|---|---|---|---|---|---|---|---|---|
| P1 (wt %) | 99 | 98 | 99.5 | 97 | 98.5 | 97.5 | 96.5 | 96.5 |
| Ad1 (wt %) | 1 | — | — | — | 1 | — | — | — |
| Ad2 (wt %) | — | 2 | — | — | — | 2 | — | — |
| Ti1 (wt %) | — | — | 0.5 | — | 0.5 | 0.5 | 0.5 | 0.5 |
| Ad3 (wt %) | — | — | — | 3 | — | — | 3 | 3 |
| Cross-linking temperature (° C.) | 220 | 220 | 220 | 240 | 220 | 220 | 240 | 180 |
| Cross-linking time (min) | 5 | 5 | 5 | 20 | 5 | 5 | 2 | 5 |
| Elongation Hot Sets (%) | broke | broke | broke | 55 | 59 | 55 | 57 | 63 |
| Gel Content (%) | 63 | 61 | <40 | 86 | 90 | 89 | 90 | 85 |

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

The invention claimed is:

1. An ethylene polymer composition comprising:
   (A) an ethylene polymer comprising epoxy-groups, and
   (B) a cross-linking agent comprising
      (B1) an organo-metallic Lewis acid, and at least one of:
      (B2) a compound comprising at least one amino group; and
      (B3) a compound comprising at least one hydroxyl group.

2. The ethylene polymer composition according to claim 1, wherein said organo-metallic Lewis acid (B1) is a compound according to formula (I):

$$M^{m+}L_n \qquad (I)$$

wherein

M is an element selected from lanthanides or an element of groups 2 to 14 of the IUPAC periodic table (1989) except the elements of the group 7 of the IUPAC periodic table (1989) and Be, C, Si, Ge, Tl, Pb, Tc, Hg and Cd;

each L is the same or different and is a ligand linked to M; and m is 1 to 4, and n is 1 to 4, with the proviso that m-n is 0.

3. The ethylene polymer composition according to claim 1, wherein said organo-metallic Lewis acid is a compound of formula: $TiL_4$.

4. The ethylene polymer composition according to claim 1, wherein each L is a saturated hydrocarbyl group, each hydrocarbyl group independently containing one or more hetero atoms selected from N, O, P, S, or Si.

5. The ethylene polymer composition according to claim 1, wherein said compound (B2) is a compound selected from the group consisting of: a saturated aliphatic (mono, di, or tri)amine with up to 50 carbon atoms; an unsaturated aliphatic (mono, di, or tri)amine with up to 50 carbon atoms; and an aromatic hydrocarbyl with up to 50 carbon atoms.

6. The ethylene polymer composition according to claim 1, wherein said compound (B2) comprises at least two amino substituents.

7. The ethylene polymer composition according to claim 1, wherein said compound (B3) is selected from aliphatic di- to hexa-alcohols or aromatic di- to hexa-alcohols.

8. The ethylene polymer composition according to claim 1 wherein the epoxy-group-containing monomer units are glycidyl methacrylate comonomer units.

9. The ethylene polymer composition according to claim 1 wherein the amount of epoxy-group-containing monomer units is at least 0.1 wt %, based on the amount of olefin polymer (A).

10. The ethylene polymer composition according to claim 1, wherein the content of epoxy-group-containing monomer units is 20 wt % or less, based on the amount of olefin polymer (A).

11. A process for cross-linking the ethylene polymer composition of claim 1, the process comprising cross-linking the ethylene polymer comprising epoxy-groups (A) using the cross-linking agent (B).

12. The process according to claim 11, wherein said cross-linking takes place for 2 to 10 minutes.

13. The process according to claim 11, wherein said cross-linking is carried out at a temperature of at least 150° C.

14. A method of use of a cross-linking agent (B) comprising:
- (B1) an organo-metallic Lewis acid, and at least one of:
- (B2) a compound comprising at least one amino group; and
- (B3) a compound comprising at least one hydroxyl group;
- the method comprising using the cross-linking agent (B) for cross-linking of an ethylene polymer comprising epoxy-groups (A).

15. The ethylene polymer composition according to claim 1, wherein said compound (B2) is a compound selected from the group consisting of: a saturated aliphatic (mono, di, or tri)amine with 1 to 20 carbon atoms; an unsaturated aliphatic (mono, di, or tri)amine with 1 to 20 carbon atoms; and an aromatic hydrocarbyl with 1 to 20 carbon atoms.

16. The ethylene polymer composition according to claim 1, wherein said compound (B3) is selected from aliphatic di-, tri- or tetra-alcohols or aromatic di-, tri- or tetra-alcohols.

* * * * *